(12) United States Patent
Park et al.

(10) Patent No.: US 11,994,277 B2
(45) Date of Patent: May 28, 2024

(54) DETACHABLE LIGHTING DEVICE (71) Applicants: HYUNDAI MOTOR COMPANY, Seoul (KR); KIA CORPORATION, Seoul (KR); LS Automotive Technologies Co., Ltd., Anyang-si (KR)

(72) Inventors: Sung Ho Park, Seoul (KR); Ki Bong Lee, Yongin-si (KR); Su Gyeong Im, Seoul (KR); Hee Youl An, Suwon-si (KR); Kyeong Sik Kim, Yongin-si (KR)

(73) Assignees: HYUNDAI MOTOR COMPANY, Seoul (KR); KIA CORPORATION, Seoul (KR); LS Automotive Technologies Co., Ltd., Anyang-si (KR)

(*) Notice: Subject to any disclaimer, the term of this patent is extended or adjusted under 35 U.S.C. 154(b) by 0 days.

(21) Appl. No.: 17/985,266

(22) Filed: Nov. 11, 2022

(65) Prior Publication Data
US 2024/0085007 A1 Mar. 14, 2024

(30) Foreign Application Priority Data
Sep. 5, 2022 (KR) .................. 10-2022-0112250

(51) Int. Cl.
*F21V 21/005* (2006.01)
*F21S 8/00* (2006.01)
*F21V 21/03* (2006.01)
*F21V 21/34* (2006.01)

(52) U.S. Cl.
CPC .............. *F21V 21/34* (2013.01); *F21S 8/038* (2013.01); *F21V 21/005* (2013.01); *F21V 21/03* (2013.01)

(58) Field of Classification Search
CPC ........ F21V 21/34; F21V 21/35; F21V 21/005; F21V 21/025; F21S 8/038
See application file for complete search history.

(56) References Cited

U.S. PATENT DOCUMENTS

2014/0085889 A1\* 3/2014 Mackiewicz ........... F21V 21/35
29/426.6
2021/0245657 A1 8/2021 Mizobata et al.

FOREIGN PATENT DOCUMENTS

KR 20210101128 A 8/2021

\* cited by examiner

*Primary Examiner* — Sean P Gramling
(74) *Attorney, Agent, or Firm* — Lempia Summerfield Katz LLC (57) ABSTRACT

Proposed is a detachable lighting device including lighting units. The positions of the lighting units are changeable along a mounting rail within an interior space. The number of the lighting units and the mounting positions of the lighting units are adjustable. Accordingly, occupants within the interior space adjust light distribution as desired by each occupant.

12 Claims, 12 Drawing Sheets

DETACHABLE LIGHTING DEVICE

CROSS REFERENCE TO RELATED APPLICATION

The present application claims priority to Korean Patent Application No. 10-2022-0112250, filed on Sep. 5, 2022, the entire contents of which are incorporated herein for all purposes by reference.

BACKGROUND

Field

The present disclosure relates to a detachable lighting device and, more particularly, to a detachable lighting device configured to provide light to a position inside a mobility vehicle in which lighting is required.

Description of the Related Art

A mobility vehicle is provided with an interior lamp to light the space inside the mobility vehicle. Such an interior lighting device may be operated to light the interior of a vehicle in response to a door being opened or in response to the operation of an occupant. Such an interior lighting device is generally disposed on the roof side within the internal space.

Recently, autonomous driving of mobility vehicles has been developed. In response to autonomous driving, the indoor space is not limited to a driver's seat, a seat beside the driver's seat, and rear seats, and the positions of the seats may be changed to provide seating places in a variety of positions.

For example, during autonomous driving, the positions of the seats inside the mobility vehicle may be changed so that occupants may face each other or sit in a circle. In this case, since interior lighting devices are fixed in specific indoor positions, positions to which light is provided are also limited. That is, the interior lighting devices are commonly disposed on the central portion above the front seats and the central portion above the rear seats, respectively. Since the positions of the interior lighting devices are fixed, when the positions of the seats are changed, it may be impossible to adjust the angle of light distribution according to the body shape or preferences of an occupant. Accordingly, when the seat position of an occupant is moved, fixed light distribution of the interior lighting devices may cause light to be blocked by the body of the occupant or, in some cases, to illuminate an unnecessary location while not illuminating a location desired by the occupant, thereby inevitably causing occupant inconvenience.

In this regard, when the angles of light distribution of the interior lighting devices are excessively increased in order to illuminate all possible seat locations, there is a problem in that light may be undesirably directed toward another occupant. The foregoing is intended merely to aid in the understanding of the background of the present disclosure. The statements in this section merely provide background information related to the present disclosure and may not constitute prior art.

SUMMARY OF THE PRESENT DISCLOSURE

The present disclosure has been made keeping in mind the above problems occurring in the related art. The present disclosure proposes a detachable lighting device able to provide light to a variety of seat locations and seat positions within an interior space of a mobility vehicle.

According to one aspect of the present disclosure, a detachable lighting device includes: a mounting rail including a plurality of fitting recesses and power terminals through which power is supplied; and a lighting unit including an inner body detachably fitted into one of the plurality of fitting recesses. In particular, the lighting unit further includes: an outer body movable along the inner body and configured to lock or unlock the inner body in or from a fitted state based on a movement position of the outer body; and a lamp disposed on the inner body and configured to emit light by receiving power when the inner body is mounted on the mounting rail.

In another embodiment, the outer body may include a first through-hole, second-through holes In particular, the first and second-through holes are provided in an upper portion of the outer body to be spaced apart in a direction from a center toward edges. The outer body may further include a deformation inducing protrusion provided in the first through-hole.

In one embodiment, the inner body may include fixing flanges formed on an upper portion thereof. The fixing flanges extend through the first through-hole to be disposed on both sides of the deformation inducing protrusion. Each of the fixing flanges may include holding protrusions provided on a distal end thereof to protrude inward and outward.

The deformation inducing protrusion may have a distal end that protrudes in a circumferential direction such that, when the outer body moves upwards or downwards, the deformation inducing protrusion causes the fixing flanges to be opened or closed, thereby causing the holding protrusions to be held by or separated from a corresponding one of the fitting recesses.

In another embodiment, the lamp may include a substrate part fixed to the outer body, a light source part disposed on a lower portion of the substrate part to emit light, and terminal portions extending from an upper portion of the substrate part through the second-through holes to be electrically connected to the power terminals.

The lamp may further include a switch part to determine whether or not to operate the light source part. The light source part may emit light in a predetermined lighting mode based on the number of times or a length of time for which the switch part is touched.

The outer body may include open holes on both sides in a first direction, and the inner body may include holding portions on both sides in the first direction to be deformable in the first direction. The holding portions are configured to be insertable into the open holes.

The holding portions of the inner body may extend upward and protrude outward such that end portions thereof are inserted into the open holes. Upper ends of the end portions may be inclined so as to slide when in contact with upper ends of the open holes. Lower ends of the end portions may be configured to be held by the open holes when in contact with lower ends of the open holes.

The outer body may include open holes on both sides in a second direction and holding portions 22 provided in the open holes, respectively. Each of the holding portions is deformable in the second direction. The inner body may include support protrusions on both sides in the second direction.

Each of the holding portions may have a semicircular or triangular shape extending upward, with a distal end thereof protruding inward. Each of the support protrusions may have a semicircular or triangular shape.

The mounting rail may include an insertion recess formed in a longitudinal direction. The plurality of fitting recesses may be provided along the insertion recess. The power terminals may be provided outside the insertion recess to extend along the insertion recess.

The outer body of the lighting unit may include a fixing part and a tilting part. The inner body may be disposed in the fixing part to lock or unlock the inner body into or from the fitted state. The lamp may be disposed in the tilting part and connected to the fixing part in a tiltable manner so as to change a direction of emitted light from the lamp.

The outer body may be configured such that a lower portion thereof surrounds the lamp.

In the detachable lighting device having the above-described structure, the positions of lighting units may be changed along the mounting rail within the interior space, and the mounting positions of the lighting units and the number of the lighting units mounted may be adjusted. Accordingly, light distribution within the interior space desired by each occupant may be met.

BRIEF DESCRIPTION OF THE DRAWINGS

The above and other objects, features, and other advantages of the present disclosure should be more clearly understood from the following detailed description when taken in conjunction with the accompanying drawings, in which.

The drawings described herein are for illustration purposes only and are not intended to limit the scope of the present disclosure in any way.

DETAILED DESCRIPTION

Hereinafter, embodiments disclosed in the present disclosure are described in detail with reference to the accompanying drawings, in which identical or similar constituent elements are given the same reference numerals regardless of the reference numerals of the drawings, and repeated description thereof has been omitted.

The component suffixes "module" and "part" used in the following description are given or mixed together only considering the ease of creating the specification, and have no meanings or roles that are distinguished from each other by themselves.

In the description of the present disclosure, when it is determined that the detailed description of the related art would obscure the gist of the present disclosure, the detailed description thereof has been omitted. In addition, the attached drawings are merely intended to be able to readily understand the embodiments disclosed herein, and thus the technical idea disclosed herein is not limited by the attached drawings, and it should be understood to include all changes, equivalents, and substitutions included in the idea and technical scope of the present disclosure.

It should be understood that, although the terms "first", "second", etc., may be used herein to describe various elements, these elements should not be limited by these terms. These terms are only used to distinguish one element from another element.

It should be understood that when an element is referred to as being "coupled", "connected", or "linked" to another element, it can be directly coupled or connected to the other element or intervening elements may be present therebetween. In contrast, it should be understood that when an element is referred to as being "directly coupled", "directly connected", or "directly connected" to another element, there are no intervening elements present.

As used herein, a singular form is intended to include a plural form as well, unless the context clearly indicates otherwise.

It should be further understood that the terms "comprise", "include", "have", etc., when used in this specification, specify the presence of stated features, integers, steps, operations, elements, components, and/or combinations thereof but do not preclude the presence or addition of one or more other features, integers, steps, operations, elements, components, and/or combinations thereof.

When a component, device, element, or the like of the present disclosure is described as having a purpose or performing an operation, function, or the like, the component, device, or element should be considered herein as being "configured to" meet that purpose or to perform that operation or function.

Hereinafter, a detachable lighting device according to embodiments of the present disclosure is described with reference to the accompanying drawings.

Figure 1:
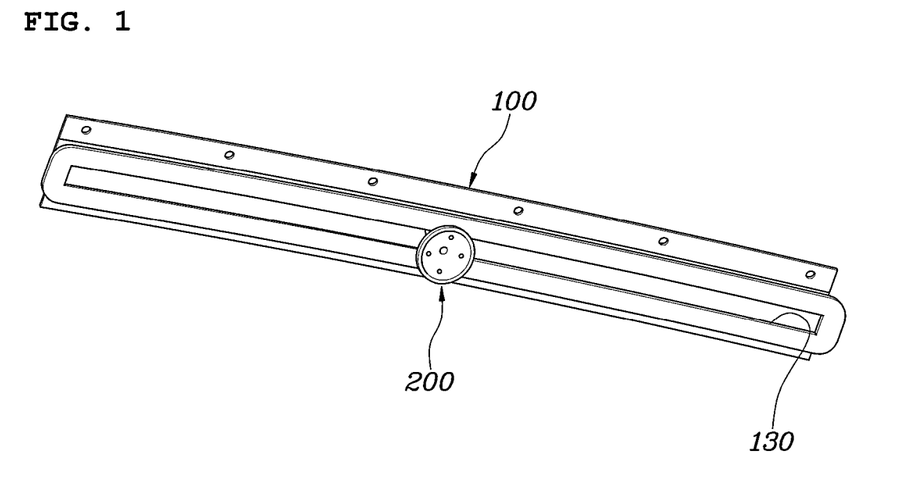
FIG. 1 is a perspective view illustrating a detachable lighting device according to an embodiment of the present disclosure.
Figure 2:
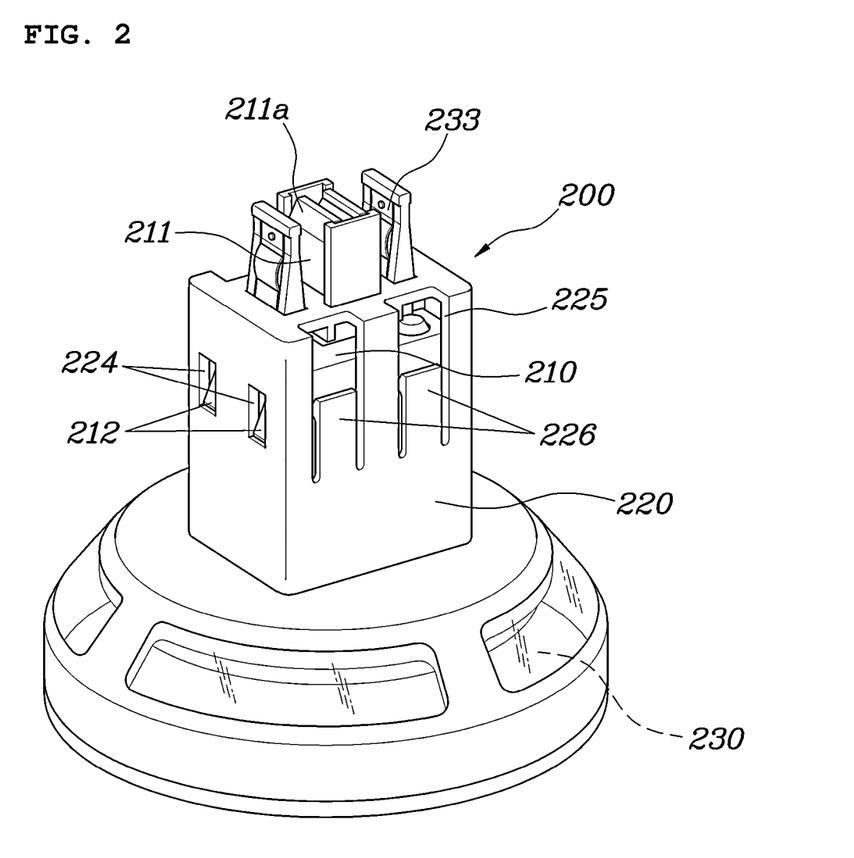
FIG. 2 is a perspective view illustrating a lighting unit of the detachable lighting device illustrated in FIG. 1.
Figure 3:
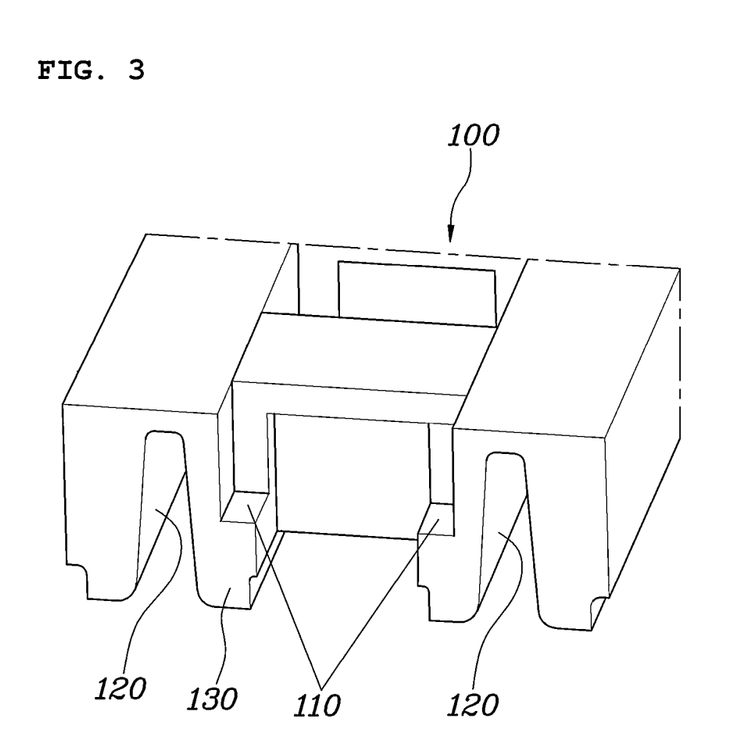
FIG. 3 is a perspective view illustrating a mounting rail of the detachable lighting device illustrated in FIG. 1.
Figure 4:
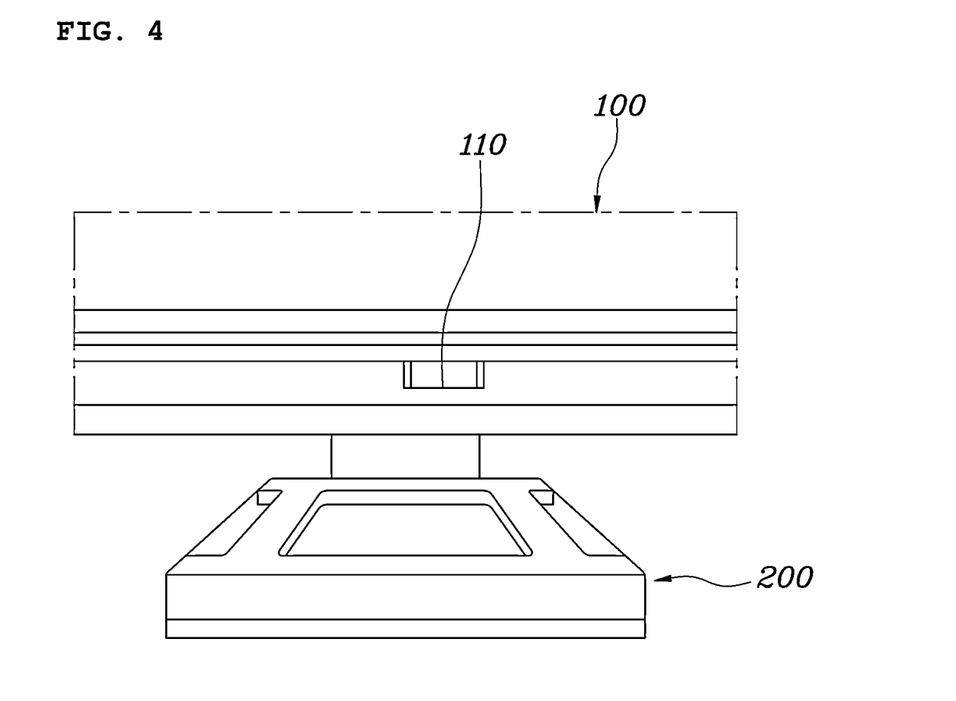
FIG. 4 is a side view illustrating the lighting unit and the mounting rail according to the present disclosure.

FIG. 1 is a perspective view illustrating a detachable lighting device according to an embodiment of the present disclosure, FIG. 2 is a perspective view illustrating a lighting unit of the detachable lighting device illustrated in FIG. 1, FIG. 3 is a perspective view illustrating a mounting rail of the detachable lighting device illustrated in FIG. 1, and FIG. 4 is a side view illustrating the lighting unit and the mounting rail according to the present disclosure.

Figure 5:
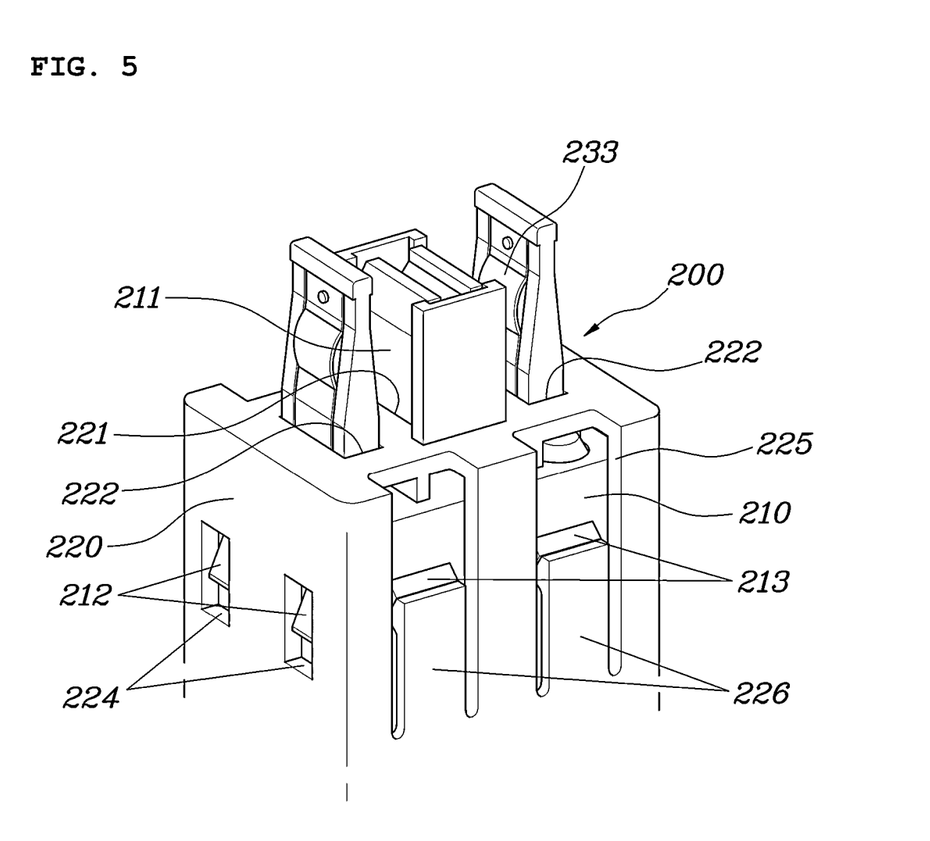
FIG. 5 is a perspective view illustrating an embodiment for locking or unlocking the lighting unit according to the present disclosure.
Figure 6:
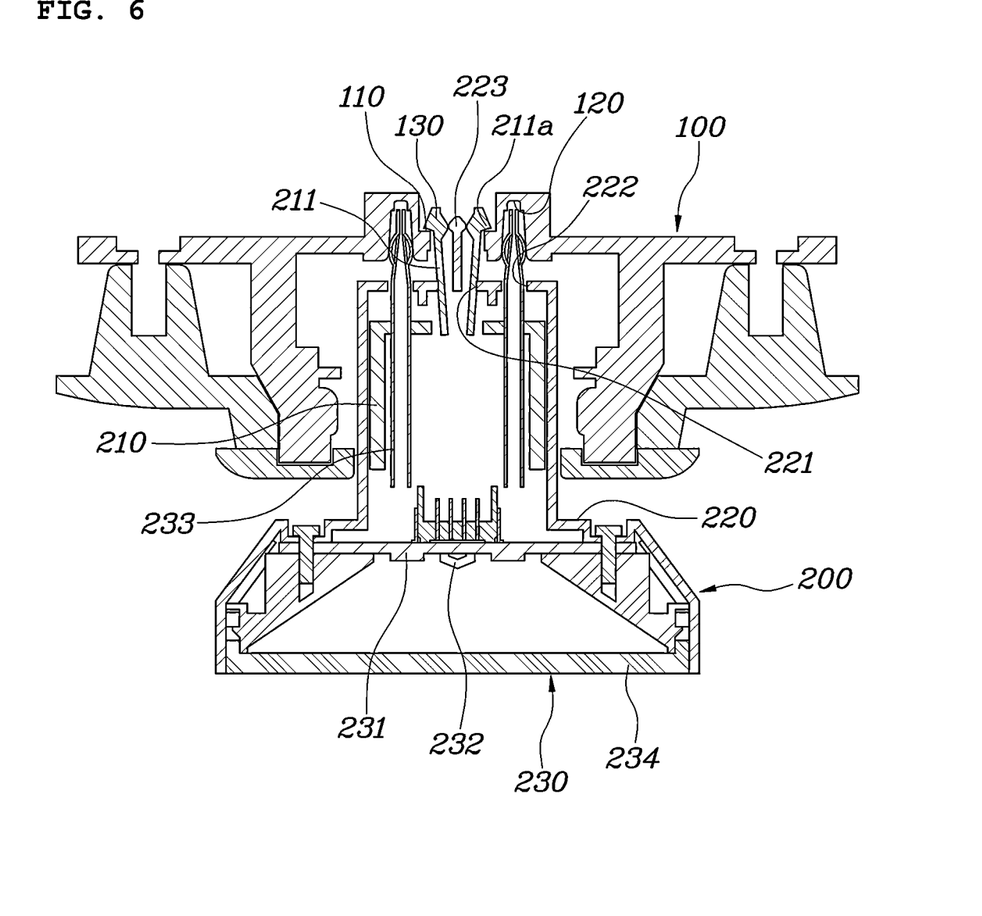
FIG. 6 is a cross-sectional view illustrating the locked state of the lighting unit according to an embodiment of the present disclosure.
Figure 7:
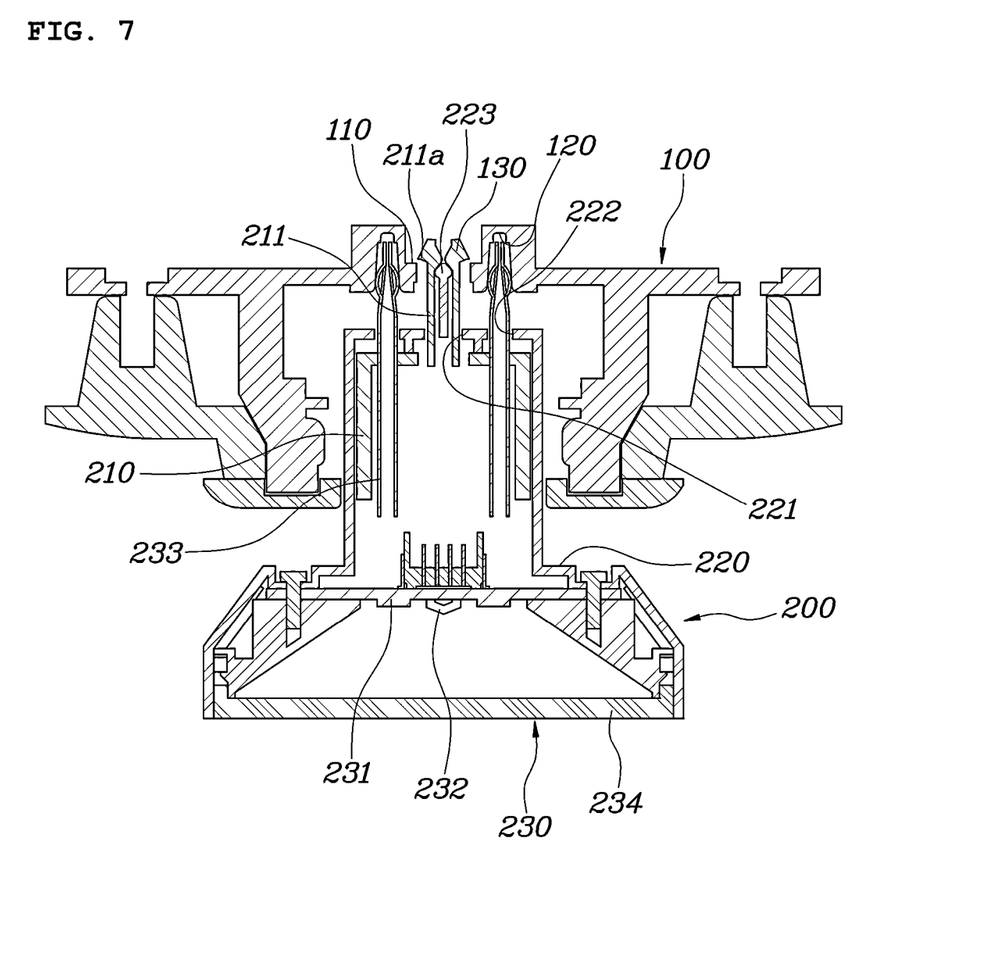
FIG. 7 is a cross-sectional view illustrating the unlocked state of the lighting unit according to an embodiment of the present disclosure.
Figure 8:
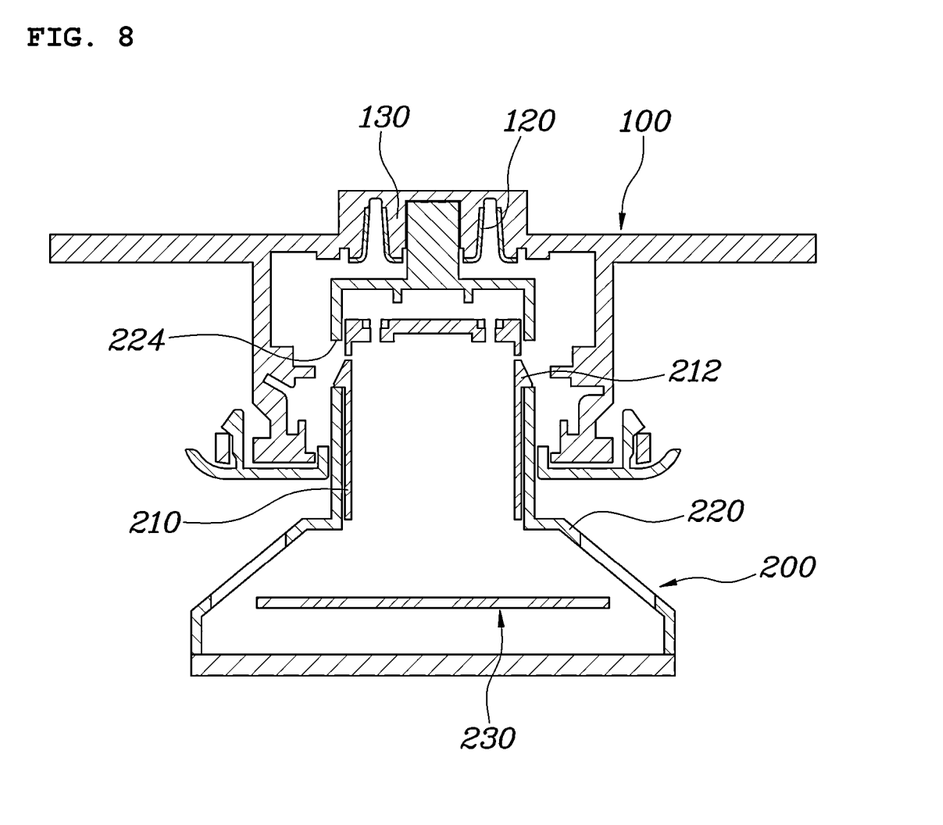
FIG. 8 is a cross-sectional view illustrating the locked state of the lighting unit according to an embodiment of the present disclosure.
Figure 9:
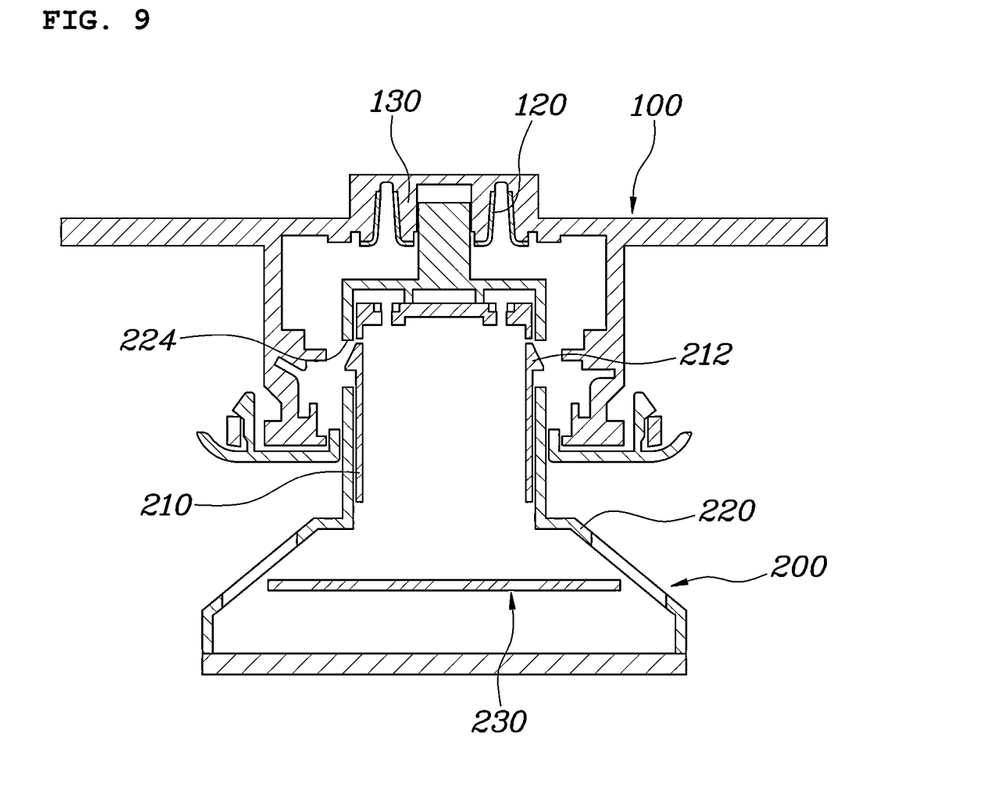
FIG. 9 is a cross-sectional view illustrating the unlocked state of the lighting unit according to an embodiment of the present disclosure.
Figure 10:
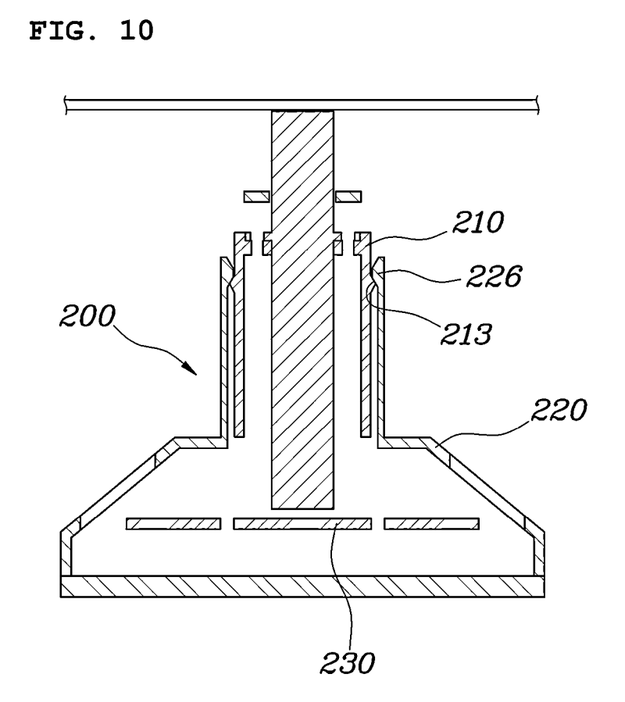
FIG. 10 is a cross-sectional view illustrating the locked state of the lighting unit according to an embodiment of the present disclosure.
Figure 11:
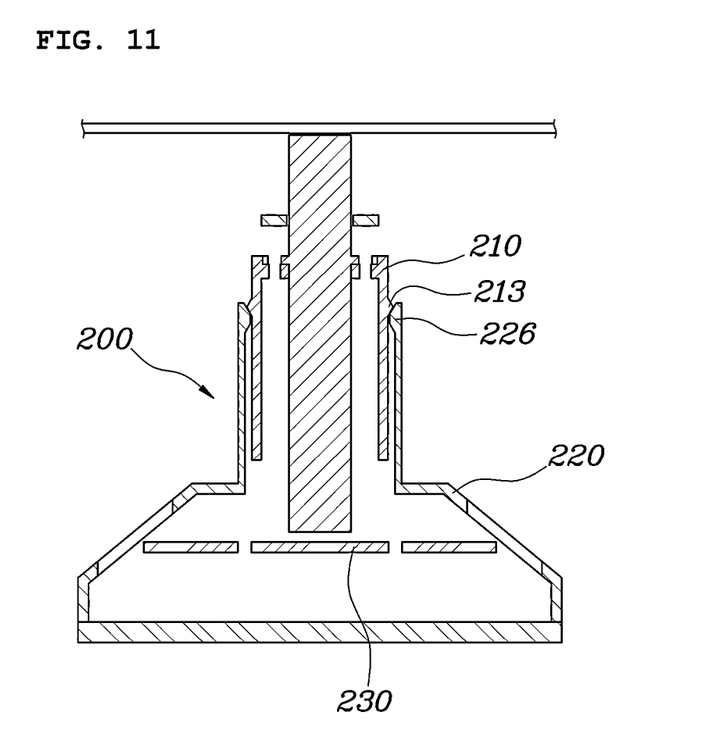
FIG. 11 is a cross-sectional view illustrating the unlocked state of the lighting unit according to an embodiment of the present disclosure.

FIG. 5 is a perspective view illustrating an embodiment for locking or unlocking the lighting unit according to the present disclosure, FIG. 6 is a cross-sectional view illustrating the locked state of the lighting unit according to the present disclosure, FIG. 7 is a cross-sectional view illustrating the unlocked state of the lighting unit according to the present disclosure, FIG. 8 is a cross-sectional view illustrating the locked state of the lighting unit according to the present disclosure, FIG. 9 is a cross-sectional view illustrating the unlocked state of the lighting unit according to the present disclosure, FIG. 10 is a cross-sectional view illustrating the locked state of the lighting unit according to the present disclosure, and FIG. 11 is a cross-sectional view illustrating the unlocked state of the lighting unit according to the present disclosure.

Figure 12:
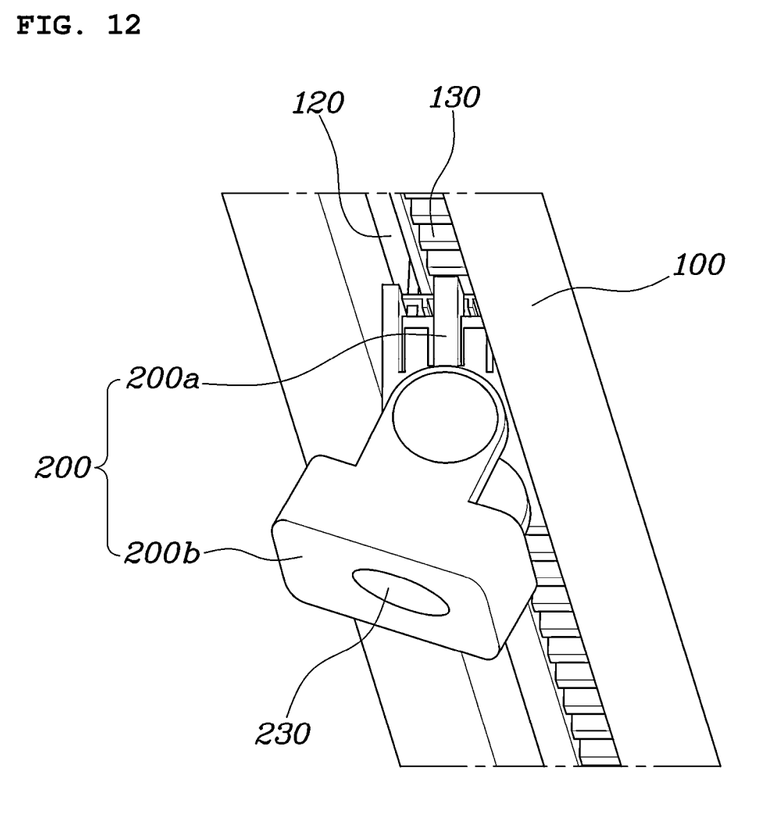
FIG. 12 is a perspective view illustrating a tilt state of the detachable lighting device according to an embodiment of the present disclosure.

In addition, FIG. 12 is a perspective view illustrating the tilt state of the detachable lighting device according to the present disclosure.

As illustrated in FIGS. 1 to 5, the detachable lighting device includes a mounting rail 100 and a lighting unit 200. The mounting rail 100 includes a plurality of fitting recesses 110 and power terminals 120 through which power is supplied are provided. The lighting unit 200 includes an inner body 210 detachably fitted into one of the plurality of fitting recesses 110, an outer body 220 movable along the inner body 210 and configured to lock or unlock the inner body 210 in or from a fitted state depending on the movement position of the outer body 220, and a lamp 230 disposed on the inner body 210 and configured to emit light by receiving power when the inner body 210 is mounted on the mounting rail 100.

In one embodiment, the mounting rail 100 may be disposed on the ceiling inside the mobility vehicle, and be configured to extend in a straight or curved shape on the inside ceiling to pass by respective seats in the internal space. This mounting rail 100 is provided with the plurality of fitting recesses 110 and the power terminals 120. Thus, the lighting unit 200 is fitted into one of the fitting recesses 110 and configured to emit light by receiving power through the power terminals 120.

That is, the lighting unit 200 includes the inner body 210, the outer body 220, and the lamp 230. The inner body 210 is fitted into one of the fitting recesses 110 of the mounting rail 100. The outer body 220 locks the inner body 210 in the fitted state to remain in the fitted state or unlocks the inner body 210 from the fitted state to be decoupled from the mounting rail 100. The lamp 230 is configured to emit light by receiving power through the power terminals 120.

In one embodiment, the lower portion of the outer body 220 surrounds the lamp 230 to protect the lamp 230 from external impacts or foreign objects.

As described above, the lighting unit 200 may be fitted into or decoupled from one of the plurality of fitting recesses 110 of the mounting rail 100 through the interaction of the inner body 210 and the outer body 220, thereby being mounted in a variety of positions on the mounting rail 100. In addition, when the lighting unit 200 is mounted on the mounting rail 100, the lamp 230 may be electrically connected to the power terminals 120 and supplied with power to emit light, thereby facilitating indoor light distribution. A plurality of lighting units 200 may be provided to facilitate light distribution required indoors.

Described in detail about the above-described present disclosure, the mounting rail 100 has an insertion recess 130 formed in the longitudinal direction. The plurality of fitting recesses 110 are formed along the insertion recess 130. The power terminals 120 are provided outside the insertion recess 130 to extend along the insertion recess 130.

As described above, the mounting rail 100 is provided with the insertion recess 130 into which the lighting unit 200 is inserted. The insertion recess 130 may extend along the mounting rail 100. The insertion recess 130 may be configured such that the outer body 220 of the lighting unit 200 is inserted into the insertion recess 130. The inner surface of the insertion recess 130 is depressed in the transverse direction, thereby forming the fitting recesses 110. The plurality of fitting recesses 110 are formed along the insertion recess 130 and spaced apart from each other at regular distances, thereby allowing the lighting unit 200 to be fixed in a variety of positions on the mounting rail 100. In addition, in the mounting rail 100, the power terminals 120 are formed outside the insertion recess 130 while being spaced apart from each other. The power terminals 120 may extend along the insertion recess 130, and be configured to transfer power from an external source. In this manner, the lighting unit 200 may be fixedly mounted on the mounting rail 100, and power may be supplied to the mounted lighting unit 200 to emit light.

Meanwhile, the lighting unit 200 may be mounted on the mounting rail 100 to be in the locked state or the unlocked state using a mechanical connection structure of the outer body 220 and the inner body 210.

FIGS. 6 to 10 are views illustrating the lighting unit 200 being locked to or unlocked from the mounting rail 100. FIGS. 6 to 10 are cross-sectional views taken from different positions to illustrate connection structures of respective components on the basis of FIG. 4.

Specifically, as illustrated in FIGS. 2 and 6, the outer body 220 has a first through-hole 221 and second-through holes 222 formed in the upper portion of the outer body 220 to be spaced apart in the direction from the center toward the edges. A deformation inducing protrusion 223 is provided in the first through-hole 221.

In addition, the inner body 210 has fixing flanges 211 formed on the upper portion of the inner body. The fixing flanges 211 extend through the first through-hole 221 to be disposed on both sides of the deformation inducing protrusion 223. Each of the fixing flanges 211 has holding protrusions 211a formed on the distal end thereof to protrude inward and outward.

In other words, the lighting unit 200 is configured such that the inner body 210 is mounted on the mounting rail 100. The lighting unit 200 is also configured such that the inner body 210 is decoupled from the mounting rail 100 or maintained in the fitted state by the inner body 210.

In this regard, the lighting unit 200 may be configured such that the fixing flanges 211 provided on the inner body 210 extend through the first through-hole 221 formed in the upper portion of the outer body 220. The lighting unit 200 may be mounted on the mounting rail 100 when the fixing flanges 211 are fitted into one of the fitting recesses 110 of the mounting rail 100. Here, the outer body 220 has the deformation inducing protrusion 223 in the first through-hole 221. The deformation inducing protrusion 223 is configured to deform the fixing flanges 211 of the inner body 210 to be held by the fitting recess 110 when the lighting unit 200 is being mounted on the mounting rail 100. Depending on the position of movement of the outer body 220 from the inner body 210, the fixing flanges 211 may be deformed by the deformation inducing protrusion 223 to be held by or separated from the fitting recess 110.

In this regard, the deformation inducing protrusion 223 is configured such that the distal end thereof protrudes in the circumferential direction. Since the deformation inducing protrusion 223 is configured to be capable of being held by the fitting recess 110, when the outer body 220 moves upwards or downwards, the deformation inducing protrusion 223 may cause the fixing flanges 211 to be opened or closed, thereby causing the holding protrusions 211a to be held by or separated from the fitting recess 110.

That is, the mounting and decoupling of the lighting unit 200 according to an embodiment of the present disclosure is performed as follows. As illustrated in FIG. 6, when the lighting unit 200 is moved toward the mounting rail 100, the fixing flanges 211 of the inner body 210 are inserted into the insertion recess 130 in the closed state, and as the outer body 220 is continuously moved upwards, the deformation inducing protrusion 223 forcibly opens the fixing flanges 211. Consequently, as the holding protrusions 211a protruding inward and outward from the distal ends of the fixing flanges 211 are held by the fitting recess 110 of the mounting rail 100, the inner body 210 is fixed to the mounting rail 100 and moved into the locked state.

Here, as illustrated in FIG. 7, when the lighting unit 200 is moved away from the mounting rail 100, the outer body 220 is moved downwards with respect to the inner body 210. At the same time, the deformation inducing protrusion 223 is moved downwards. In detail, the deformation inducing protrusion 223 is separated from the holding protrusions 211a of the fixing flanges 211, and the fixing flanges 211 are returned to the original position, so that the holding protrusions 211a are separated and unlocked from the fitting recesses 110. As a result, the inner body 210 may be decoupled from the mounting rail 100.

In one embodiment, the lamp 230 may be connected to the power terminals 120 of the mounting rail 100 through the second-through holes 222 of the outer body 220.

According to an embodiment of the present disclosure, the lamp 230 may include: a substrate part 231 fixed to the outer body 220, a light source part 232 disposed on the lower portion of the substrate part 231 to emit light, and terminal portions 233 extending from the upper portion of the substrate part 231 through the second-through holes 222 to be electrically connected to the power terminals 120.

In one embodiment, the substrate part 231 may be implemented as a printed circuit board (PCB). The light source part 232 for emitting light is disposed on the substrate part 231, and the operation is determined in response to a control signal. In particular, the substrate part 231 is provided with the terminal portions 233 to supply power. The terminal portions 233 may extend through the second-through holes 222 of the outer body 220 to be connected to the power terminals 120 of the mounting rail 100. In addition, a portion of the outer body 220 may be formed transparent, and thus, the light source part 232 may emit light not only through the lower portion of the outer body 220 but also through the transparent portion of the outer body 220.

Accordingly, when the lighting unit 200 is mounted on the mounting rail 100, the inner body 210 fitted to the fitting recess 110 of the mounting rail 100 is fixed in position by the outer body 220, and the terminal portions 233 of the lamp 230 are electrically connected to the power terminals 120 of the mounting rail 100, thereby allowing light to be emitted by the light source part 232.

Meanwhile, the lamp 230 further includes a switch part 234 to determine whether or not to operate the light source part 232. The light source part 232 may emit light in a predetermined lighting mode based on the number of times or the length of time for which the switch part 234 is touched. Here, the switch part 234 may be a separate switch provided on a lens of the light source part 232 or the outer body 220. The switch part 234 may be implemented using a variety of operation types, such as a touch type or a pressing type. In addition, the lighting mode may be set as an on/off mode, a step-by-step brightness control mode, or the like.

Each mode may be selectively controlled depending on the number or the length of time by which the switch part 234 is touched.

Meanwhile, the lighting unit 200 may be locked or unlocked by a structural interaction of the inner body 210 and the outer body 220.

Specifically, as illustrated in FIGS. 2 and 8, the outer body 220 may have open holes 224 on both sides in a first direction, whereas the inner body 210 may have holding portions 212 on both sides in the first direction to be deformable in the first direction. The holding portions 212 are configured to be insertable into the open holes 224.

Here, the first direction may be a transverse direction about the lighting unit 200, whereas a second direction may be set to be a direction perpendicular to the first direction.

As described above, the outer body 220 has the open holes 224 formed on both sides in the first direction, and the inner body 210 has the holding portions 212 configured to be insertable into the open holes 224. Thus, the position of the lighting unit 200 may be fixed based on whether or not the holding portions 212 are fastened to the open holes 224.

Here, the open holes 224 and the holding portions 212 may be provided as a plurality of open holes 224 and a plurality of holding portions 212. The open holes 224 disposed on both sides in the first direction are configured to be the same, and the holding portions 212 disposed on both sides in the first direction are configured to be the same. Due to this configuration, the inner body 210 and the outer body 220 may be firmly fixed in position.

In an embodiment, the holding portions 212 of the inner body 210 extend upward and protrude outward such that the end portions thereof are inserted into the open holes 224. The upper ends of the end portions may be inclined so as to slide when in contact with the upper ends of the open holes 224, whereas the lower ends of the end portions may be configured to be held by the open holes 224 when in contact with the lower ends of the open holes 224.

As described above, as the holding portions 212 extend upward, the holding portions 212 are allowed to move to the sides. Since the end portions of the holding portions 212 are configured such that the upper ends are inclined and the lower ends are orthogonally bent, the locking or unlocking operation is performed depending on the position of movement of the outer body 220.

That is, as illustrated in FIG. 8, when the lighting unit 200 is moved toward the mounting rail 100, the inner body 210 is fitted to and fixed in position by the fitting recess 110 of the mounting rail 100. As the lower ends of the holding portions 212 of the inner body 210 are in contact with and held by the lower ends of the open holes 224 of the outer body 220, the upward movement of the outer body 220 is limited. Consequently, it is possible to prevent the deformation inducing protrusion 223 from being separated from the holding protrusions 211a of the fixing flanges 211, which situation would otherwise be caused by excessive upward movement of the outer body 220 when the lighting unit 200 is mounted on the mounting rail 100. As a result, the lighting unit 200 may be fixed to the mounting rail 100 and maintained in the locked state.

Here, as illustrated in FIG. 9, when the lighting unit 200 is moved away from the mounting rail 100, in response to the outer body 220 moving downwards with respect to the inner body 210, the holding portions 212 are separated from the lower ends of the open holes 224, thereby allowing the outer body 220 to move downward.

Meanwhile, the outer body 220 has open holes 225 on both sides in the second direction and holding portions 226 provided in the open holes 225, respectively. Each of the holding portions 226 is deformable in the second direction. The inner body 210 may have support protrusions 213 on both sides in the second direction.

That is, as illustrated in FIGS. 2 and 10, the inner body 210 has the support protrusions 213 on both sides in the second direction, and the outer body 220 has the open holes 225 formed on both sides in the second direction. The open holes 225 allow the support protrusions 213 to be inserted thereinto, thereby allowing the outer body 220 to be moved upwards and downwards with respect to the inner body 210. In addition, the outer body 220 has the holding portions 226 on the lower ends of the open holes 225, and the holding portions 226 extend upward to be deformable in the second direction. As the holding portions 226 are in contact with the support protrusions 213, the position of the lighting unit 200 is fixed.

Here, the support protrusions 213 of the inner body 210 may be provided as a plurality of support protrusions 213, and the open holes 225 and the holding portions 226 of the outer body 220 may be provided as a plurality of open holes 225 and a plurality of holding portions 226. The plurality of support protrusions 213 on both sides in the second direction may be configured to be the same, the plurality of open holes 225 on both sides in the second direction may be configured to be the same, and the plurality of holding portions 226 on both sides in the second direction may be configured to be the same. The inner body 210 and the outer body 220 may be firmly fixed in position.

In an embodiment, each of the holding portions 226 may have the shape of a semicircle or a triangle extending upward, with the distal end thereof protruding inward, whereas each of the support protrusions 213 may have the shape of a semicircle or a triangle.

In one embodiment, the holding portions 226 (e.g., hook portions) and the support protrusions 213 may be configured to be held by each other. The holding portions 226 and the support protrusions 213 may also be configured such that the holding portions 226 are deformed depending on the amount of movement of the outer body 220, thereby allowing the passage of the support protrusions 213.

In one embodiment, the holding portion 226 may have a hook shape. The hook-shaped portions 226 and the support protrusions 213 may be configured to respectively be held by each other, so that the hook-shaped portions 226 are deformed based on the amount of movement of the outer body 220, thereby allowing the passage of the support protrusions 213.

Thus, as illustrated in FIG. 10, when the lighting unit 200 is moved toward the mounting rail 100, the inner body 210 is fitted to one of the fitting recesses 110 of the mounting rail 100, whereby the position of the inner body 210 is fixed. As the holding portions 226 of the outer body 220 move over the support protrusions 213 of the inner body 210 and then are in contact with and held by the upper ends of the support protrusions 213, downward movement of the outer body 220 is limited. Thus, when the lighting unit 200 is mounted on the mounting rail 100, the position of the outer body 220 is fixed, thereby being able to prevent the deformation inducing protrusion 223 from being separated from the holding protrusions 211a of the fixing flanges 211 as described above. Consequently, the lighting unit 200 may be fixed to the mounting rail 100, thereby maintaining the locked state.

Here, as illustrated in FIG. 11, when the lighting unit 200 is moved away from the mounting rail 100, the outer body 220 is moved downwards with respect to the inner body 210 and, at the same time, the holding portions 226 of the outer body 220 are moved over the support protrusions 213 of the inner body 210 and to the lower ends of the support protrusions 213. In addition, as the outer body 220 is moved downwards with respect to the inner body 210, the deformation inducing protrusion 223 is separated from the holding protrusions 211a of the fixing flanges 211. Consequently, the lighting unit 200 may be decoupled from the mounting rail 100.

As described above, according to the present disclosure, the lighting unit 200 may be dispose in a variety of positions on the mounting rail 100. That is, when the lighting unit 200 is mounted on the mounting rail 100, the lighting unit 200 is pushed toward the mounting rail 100. Due to the deformation inducing protrusion 223 of the outer body 220, the fixing flanges 211 of the inner body 210 are held by the fitting recesses 110 of the fixing flanges 211, and the holding portions 212 of the inner body 210 are fastened to the open holes 224 of the outer body 220. As the holding portions 226 of the outer body 220 are held by the upper ends of the support protrusions 213, the inner body 210 and the outer body 220 may be maintained in position in the locked state.

Meanwhile, when decoupling the lighting unit 200 from the mounting rail 100, only pulling the outer body 220 away from the mounting rail 100 may separate the deformation inducing protrusion 223 of the outer body 220 from the fixing flanges 211 of the inner body 210, thereby separating the fixing flanges 211 from the fitting recesses 110. In addition, as the holding portions 212 of the inner body 210 are separated from the open holes 224 of the outer body 220 and the holding portions 226 of the outer body 220 are moved to the lower ends of the support protrusions 213 of the inner body 210, the outer body 220 is unlocked. As a result, as the outer body 220 is moved with respect to the inner body 210, the lighting unit 200 may be decoupled from the mounting rail 100.

Meanwhile, as illustrated in FIG. 12, the outer body 220 of the lighting unit 200 includes a fixing part 220a and a tilting part 220b. The inner body 210 is disposed in the fixing part 220a to lock or unlock the inner body 210 into or from the fitted state. The lamp 230 is disposed in the tilting part 220b and connected to the fixing part 220a in a tiltable manner, thereby enabling the direction of emitted light from the lamp 230 to be changed.

That is, in the lighting unit 200, the outer body 220 includes the fixing part 220a and the tilting part 220b. The fixing part 220a and the tilting part 220b are rotatably connected to each other via a hinge structure. The direction of emitted light may be changed depending on the position of rotation of the tilting part 220b. Here, the inner body 210 is disposed in the fixing part 220a, and the fixing part 220a is fitted and fixed to the mounting rail 100 through the inner body 210. The lamp 230 is disposed in the tilting part 220b, and the direction of emitted light from the lamp 230 is adjusted depending on the position of the tilting part 220b. The tilting part 220b may be configured to not only be tilted in a single direction as illustrated in FIG. 12, but also be rotatable 360°.

In the detachable lighting device having the above-described structure, the position of the lighting unit 200 may be changed along the mounting rail 100 within the interior space. In addition, the mounting positions and the number of the lighting units 200 mounted may be adjusted. Accordingly, light distribution within the interior space desired by each occupant may be met.

Although specific embodiments of the present disclosure have been described and illustrated, those having ordinary skill in the art should appreciate that various alternations and modifications are possible without departing from the technical spirit of the present disclosure.

What is claimed is:

1. A detachable lighting device comprising:
a mounting rail comprising a plurality of fitting recesses and power terminals through which power is supplied; and
a lighting unit comprising:
an inner body detachably fitted into a fitting recess of the plurality of fitting recesses,
an outer body movable along the inner body and configured to lock or unlock the inner body in or from a fitted state based on a movement position of the outer body, and
a lamp disposed on the inner body and configured to emit light by receiving power when the inner body is mounted on the mounting rail,
wherein a lower portion of the outer body is configured to surround the lamp.

2. A detachable lighting device comprising:
a mounting rail comprising a plurality of fitting recesses and power terminals through which power is supplied; and
a lighting unit comprising:
an inner body detachably fitted into a fitting recess of the plurality of fitting recesses,
an outer body movable along the inner body and configured to lock or unlock the inner body in or from a fitted state based on a movement position of the outer body, and
a lamp disposed on the inner body and configured to emit light by receiving power when the inner body is mounted on the mounting rail,
wherein the outer body comprises: a first through-hole, second-through holes, and a deformation inducing protrusion, and
wherein the first and second-through holes are provided in an upper portion of the outer body to be spaced apart in a direction from a center toward edges, and the deformation inducing protrusion is provided in the first through-hole.

3. The detachable lighting device of claim 2, wherein the inner body comprises fixing flanges formed on an upper portion thereof, the fixing flanges configured to extend through the first through-hole to be disposed on both sides of the deformation inducing protrusion, and
wherein each of the fixing flanges comprises holding protrusions provided on a distal end thereof to protrude inward and outward.

4. The detachable lighting device of claim 3, wherein a distal end of the deformation inducing protrusion protrudes in a circumferential direction such that, when the outer body moves upwards or downwards, the deformation inducing protrusion causes the fixing flanges to be opened or closed, thereby causing the holding protrusions to be held by or separated from a corresponding fitting recess among the fitting recesses.

5. The detachable lighting device of claim 2, wherein the lamp comprises:
a substrate part fixed to the outer body,
a light source part disposed on a lower portion of the substrate part to emit light, and
terminal portions extending from an upper portion of the substrate part through the second-through holes to be electrically connected to the power terminals.

6. The detachable lighting device of claim 5, wherein the lamp further comprises a switch part configured to determine whether or not to operate the light source part, and
wherein the light source part is configured to emit light in a predetermined lighting mode based on a number of times or a length of time for which the switch part is touched.

7. The detachable lighting device of claim 1, wherein the outer body comprises open holes on both sides in a first direction, and
wherein the inner body comprises holding portions on both sides in the first direction to be deformable in the first direction, the holding portions configured to be inserted into the open holes.

8. The detachable lighting device of claim 7, wherein the holding portions of the inner body are configured to extend upward and protrude outward such that end portions thereof are inserted into the open holes, and
wherein upper ends of the end portions are inclined so as to slide when in contact with upper ends of the open holes, and lower ends of the end portions are configured to be held by the open holes when in contact with lower ends of the open holes.

9. The detachable lighting device of claim 1, wherein the outer body comprises: open holes formed in sides of the outer body in a second direction, and holding portions provided in the open holes, respectively, each of the holding portions configured to be deformable in the second direction, and
wherein the inner body comprises support protrusions formed on sides of the inner body in the second direction.

10. The detachable lighting device of claim 9, wherein each of the holding portions has a semicircular or triangular shape extending upward, with a distal end thereof protruding inward, and
wherein each of the support protrusions has a semicircular or triangular shape.

11. The detachable lighting device of claim 1, wherein the mounting rail comprises an insertion recess formed in a longitudinal direction, the plurality of fitting recesses is provided along the insertion recess, and the power terminals are provided outside the insertion recess to extend along the insertion recess.

12. A detachable lighting device comprising:
a mounting rail comprising a plurality of fitting recesses and power terminals through which power is supplied; and
a lighting unit comprising:
an inner body detachably fitted into a fitting recess of the plurality of fitting recesses,
an outer body movable along the inner body and configured to lock or unlock the inner body in or from a fitted state based on a movement position of the outer body, and
a lamp disposed on the inner body and configured to emit light by receiving power when the inner body is mounted on the mounting rail,
wherein the outer body of the lighting unit comprises a fixing part and a tilting part,
the inner body is disposed in the fixing part to lock or unlock the inner body into or from the fitted state, and
the lamp is disposed in the tilting part and connected to the fixing part in a tiltable manner so as to change a direction of emitted light from the lamp.

* * * * *